United States Patent
Kaushik et al.

(10) Patent No.: US 10,489,349 B2
(45) Date of Patent: Nov. 26, 2019

(54) PROTECTING FILES AND FOLDERS ON A SHARED APPLICATION LAYER

(71) Applicant: Dell Products L.P., Round Rock, TX (US)

(72) Inventors: Puneet Kaushik, Fremont, CA (US); Rushikesh P. Patil, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 14/932,731

(22) Filed: Nov. 4, 2015

(65) Prior Publication Data
US 2017/0124105 A1 May 4, 2017

(51) Int. Cl.
*G06F 16/14* (2019.01)
*G06F 16/13* (2019.01)
*G06F 16/16* (2019.01)

(52) U.S. Cl.
CPC ............ *G06F 16/148* (2019.01); *G06F 16/13* (2019.01); *G06F 16/162* (2019.01)

(58) Field of Classification Search
CPC ......... G06F 17/30094; G06F 17/30091; G06F 17/30106; G06F 17/30117; G06F 17/30123; G06F 17/30132; G06F 17/30171; G06F 17/30235
See application file for complete search history.

(56) References Cited

U.S. PATENT DOCUMENTS

| | | | | |
|---|---|---|---|---|
| 5,832,263 A * | 11/1998 | Hansen | ................. | G06F 16/181 |
| | | | | 719/322 |
| 6,266,785 B1 * | 7/2001 | McDowell | ............ | G06F 11/203 |
| | | | | 714/11 |
| 8,843,903 B1 * | 9/2014 | Blaser | ....................... | G06F 8/61 |
| | | | | 717/135 |
| 9,135,284 B1 * | 9/2015 | Vidwans | ........... | G06F 17/30309 |
| 2004/0002942 A1 * | 1/2004 | Pudipeddi | ............... | G06F 16/10 |
| 2004/0225690 A1 * | 11/2004 | Arkeketa | .............. | G06F 21/604 |
| 2005/0027746 A1 * | 2/2005 | Lin | .................... | G06F 17/30115 |
| 2005/0114363 A1 * | 5/2005 | Borthakur | ............... | G06F 16/10 |
| 2006/0004759 A1 * | 1/2006 | Borthakur | ............... | G06F 16/10 |
| 2008/0109394 A1 * | 5/2008 | Havens | ............. | G06F 17/30365 |
| 2011/0040812 A1 * | 2/2011 | Phillips | ............... | G06F 9/45541 |
| | | | | 707/822 |
| 2016/0055167 A1 * | 2/2016 | Vidwans | ........... | G06F 17/30309 |
| | | | | 707/689 |
| 2017/0083541 A1 * | 3/2017 | Mann | ...................... | G06F 3/065 |

* cited by examiner

*Primary Examiner* — Jesse P Frumkin
(74) *Attorney, Agent, or Firm* — Baker Botts L.L.P.

(57) ABSTRACT

Files and folders on a read-only shared layer may be protected by using a read-write layer. File system level hooks are added to capture and simulate the rename and delete operation that would otherwise corrupt or destroy files and folders on a read-only layer. Each read-write layer has an associated file system metadata cache that gives an overview of the data contained by the layer. Relevant metadata is added for the metadata entry associated with a file or folder subjected to a rename or delete operation so as to track the file system operations associated with the file or folder. One or more metadata flags may be used to assist in tracking the file system operations.

20 Claims, 5 Drawing Sheets

PROTECTING FILES AND FOLDERS ON A SHARED APPLICATION LAYER

TECHNICAL FIELD

This disclosure relates generally to information handling systems and, more particularly, to providing layered resources to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

SUMMARY

In one embodiment a method, for example, a method for protecting file or folders on a layer, comprises receiving a first file system operation, wherein the first file system operation comprises one of a rename operation and a delete operation. A first entry is created in a write-layer metadata cache associated with the file system operation, wherein the first entry comprises a reference to one or more of a first file and a first folder. A second file system operation is received, wherein the second file system operation comprises one of an open operation, a rename operation, a delete operation, and a query operation, and wherein the second file system operation includes a reference to one or more of the first file and the first folder. A response to the second file system operation is modified based, at least in part, on the first entry and the modified response is presented.

In one embodiment the first file system operation is a rename operation and creating the first entry comprises creating a rename entry in the write-layer metadata cache. Creating the rename entry may also comprise creating a link to the one or more of the first file and the first folder, creating a parameter indicative of one or more of a second file and second folder associated with the rename operation, and setting a flag associated with the rename entry indicative of the rename operation.

In one embodiment the first file system operation is a delete operation and creating the first entry comprises creating a delete entry in the write-layer metadata cache. Creating the delete entry may also comprise creating a link associated with the delete entry to the one or more of the first file and the first folder and setting a flag associated with the delete entry indicative of the delete operation.

In one embodiment the file system operation is a query operation. The query operation is sent to all mounted layers and the results from the mounted layers are merged. It is determine whether the first entry exists based, at least in part, on the merged results.

In one embodiment, one or more computer-readable non-transitory storage media embodying logic that is operable when executed to perform or implement one or more embodiments. In one embodiment, An information handling system comprises one or more processors and a memory coupled to the processors comprising instructions executable by the processors, the processors being operable when executing the instructions to perform or implement one or more embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
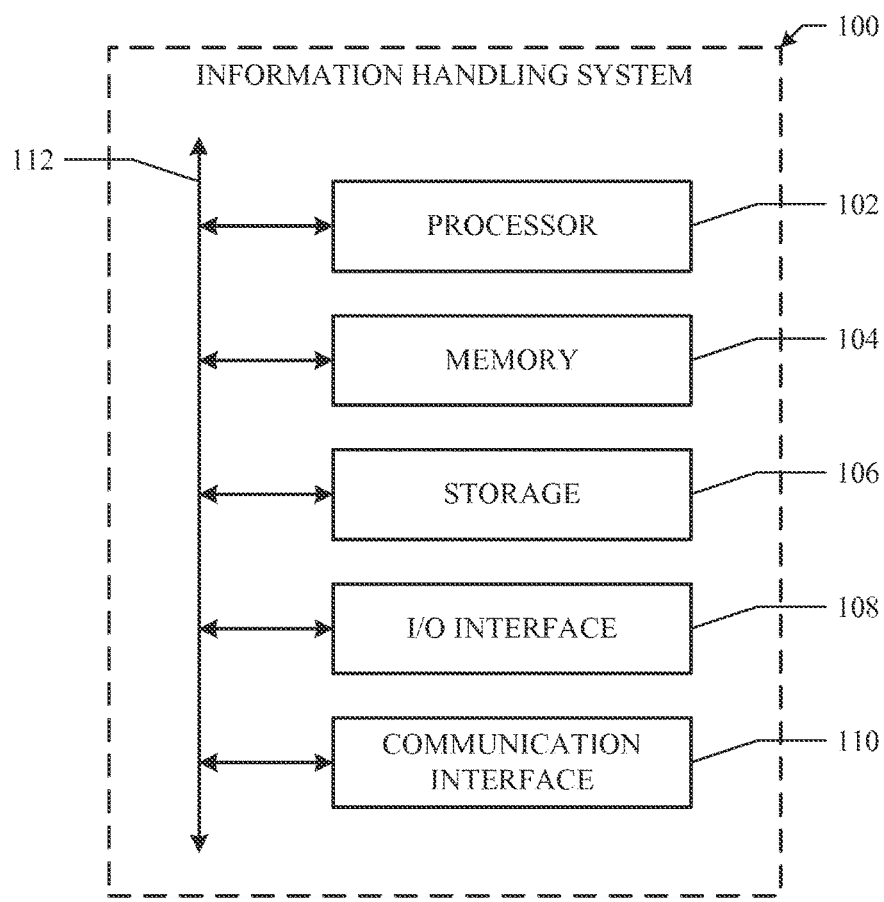
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
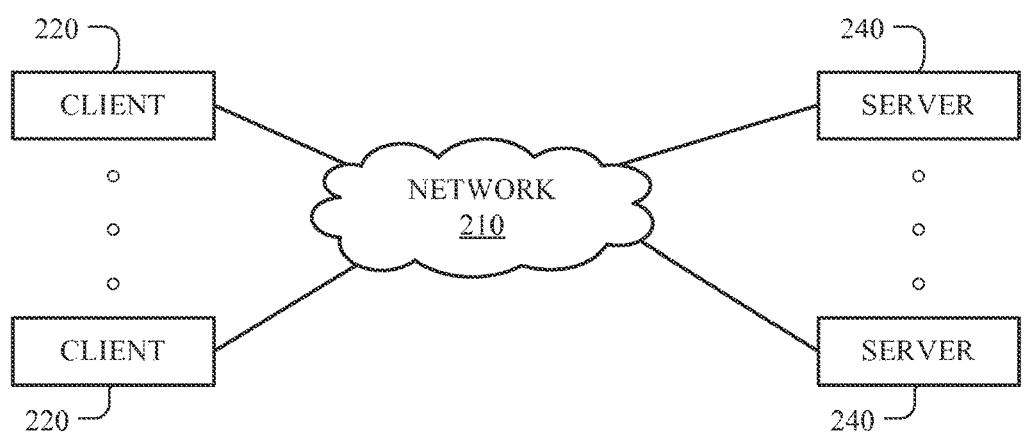
FIG. 2 is an example of a network environment.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

A system and method for providing layered resources to an information handling system is disclosed herein. A layer is a container or collection of data or resources. The data or resources may comprise executable code, such as an operating system or user application. The data or resources may comprise configuration data for an information handling system, such as registry settings in a Microsoft Windows environment, or other data structures used to store configuration settings, such as text files, extensible markup language (XML) files, and the like. The data or resources may comprise files in any format, including but not limited to, text files, HTML files, or proprietary files such as Microsoft Word ".DOC" or ".DOCX" files or Microsoft Excel ".XLS" spreadsheets.

Figure 3:
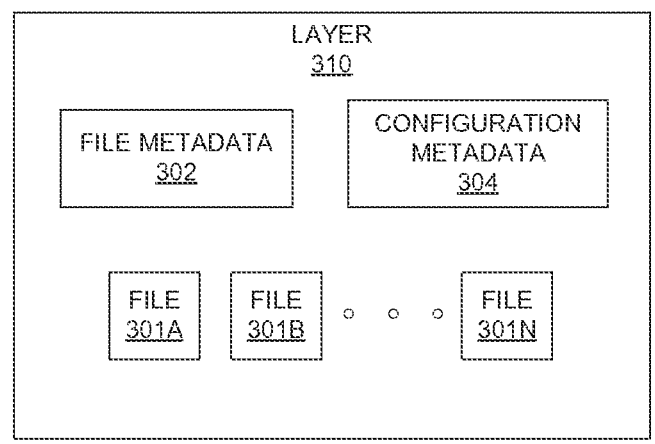
FIG. 3 is an example of a layer.

FIG. 3 illustrates a particular embodiment of a layer 310. In this embodiment, layer 310 contains one or more files or resources 301A-301N associated with an application, such as Microsoft Word, Microsoft Excel, Microsoft Outlook, Adobe Acrobat, or the FireFox web browser. The files or resources 301A-301N may comprise executable code, non-executable data (e.g., images, help files, templates, et cetera), or a combination of executable and non-executable data. The layer may also contain configuration information necessary for the application to run on the information handling system. For example, for an application executable by a Microsoft Windows operating system, the application may require one or more registry settings. Therefore, the layer may store the registry keys and values associated with the application. The registry keys and values may be stored as metadata. In particular embodiments, the registry keys and values may be stored in a registry hive in the layer.

In particular embodiments, the layer comprises an operating system image, and files 301A-301N comprise the executable and non-executable files associated with a particular operating system. For example, the files may comprise the bootloader, the kernel, hardware drivers, software drivers, and other files associated with the operating system. The layer may also contain configuration information necessary for the operating system, such as environment settings and network configuration settings.

In particular embodiments, a layer may contain data or resources for more than one application or operating system. For example, an organization may create an "Accounting Department" layer that contains all the files, resources, or configuration settings necessary for applications deployed to users in the organization's accounting department. Continuing with this example, the accounting department layer may contain an image of Microsoft Excel, Microsoft Word, and other applications typically deployed to users in the accounting department, all in a single layer. In particular embodiments, the layer may also contain files, resources, or configuration settings for one or more operating systems.

A layer may also contain metadata that describes the contents of the layer. Any suitable data structure, such as an XML file, a hash table, a tree data structure, an array, a linked list, a Microsoft registry hive, may be used to store the metadata, any data structure known to one ordinary skill in the art or any combination thereof. The layer may contain one or more data structures to store the metadata. Referring to the particular embodiment depicted in FIG. 3, layer 310 comprises file metadata 302 and configuration metadata 304. File metadata 302 may comprise one or more data structures identifying the files 301A-301N stored in layer 310, identify one or more logical blocks associated with the files, or identify one or more logical-to-physical mappings of the files. Configuration metadata 304 may store configuration settings associated with the layer, or identify where configuration settings associated with the layer are stored. In particular embodiments, registry key and value pairs are stored in configuration metadata 304. In particular embodiments, the configuration metadata is stored in a Microsoft registry hive.

No particular storage medium is required for storing a layer and the associated data or resources. By way of example and not by way of limitation, layer 310 may be stored on a hard disk drive (e.g., a partition the hard disk drive), a virtual disk, a RAM disk, a USB storage device, a flash storage device, a DVD (digital versatile disc), or any other suitable storage medium. The storage medium may be local to the information handling system. In particular embodiments, the storage medium may be remote from the information handling system. For example, the storage medium may comprise a network file share (e.g., a Network File System share, an NTFS/SMB file share), a block-based network share (e.g., storage area network using FibreChannel or iSCSI), or a cloud storage service. In a particular embodiment, a layer may be stored on a streaming virtual disk (vDisk). By way of example and not by way of limitation, an implementation of a streaming vDisk is available from Dell Inc. In particular embodiments, a layer may comprise a folder or directory on a storage medium where the data and resources associated with the layer are stored. For example, a layer may comprise a partition of a streaming Virtual Disk (vDisk) where all of the data and resources associated with the layer are stored.

In particular embodiments, a layer may be stored remotely from the information handling system. If the information handling system maintains connectivity to the remote storage medium, the layer may remain remotely stored from the information handling system. In particular embodiments, the layer (or portions of the layer) may be cached or staged to a storage medium local to the information handling system. For example, caching or staging a layer locally may permit increased performance during runtime or permit offline usage of the layer. The layering system and method disclosed herein does not require that the one or more layers provided to the information handling system be stored on a single type of storage medium or at a single location. By way of example and not by way of limitation, an information handling system may be provided with access to a first layer that is stored on a local storage medium, and a second layer that is stored on a remote storage medium.

In particular embodiments, the layering system comprises a layering client, a layering file-system filter driver (LFFD), and a layering registry filter driver (LRFD) provided for the information handling system.

In particular embodiments, the layering client is responsible for managing the mounting of layers. The layering client may determine which layers are to be mounted based upon the identity of the user, a role associated with the user, an identifier of the information handling system, a geographic location, or any other criteria that may be relevant to provisioning software to an information handling system. Layers may be mounted at boot time (such as when a layer is used to provide the operating system), during a log-on process, or dynamically (such as when a user clicks an icon associated with a layer resource). In particular embodiments, a layer is mounted as a file system and is assigned an available drive letter. The drive associated with the drive letter may be hidden from the user to prevent a user from directly accessing or modifying the contents of the layer. When more than one layer is mounted, the layering client may assign a priority or ordering to the mounted layers. The assigned priority or ordering may be used to resolve conflicts between layers, such as when more than one mounted layer contains a similarly named resource.

In particular embodiments, the criteria or rules to mount a layer are decoupled from the client device where layers are actually mounted. For example, the layering client may send an identifier associated with the current user and an identifier associated with the client device 220 to a management server 240. The management server 240 is responsible for applying the criteria or rules to determine which layers the client device 220 should mount. The rules or criteria may comprise any combination of user name, a group associated with the user, time of the day, type of device (laptop/PC/Tablet), or any other suitable criteria.

In particular embodiments, the layering client may configure the other layering drivers provided for the information handling system 100. For example, the layering client may notify the layering drivers when a layer has been mounted or dismounted. The layering client may also be used to alter the operating state of the layering drivers. For example, the layering drivers may have multiple operating states, such as a "normal" or "runtime" state, and an "install" or "create layer" state.

In particular embodiments, a method of creating a layer is disclosed herein. The layering client may receive a notification to create a layer. The notification may be received from a user interface provided on the information handling system 100 or may be received from a remote information handling system 100. The layering client may determine a target storage location on a suitable storage medium from the notification, or by prompting a selection by a user of the information handling system 100. The layering client may re-format the target storage location if appropriate. The layering client may create a file metadata 302, a configuration metadata 304, or both on the target storage location. If any other layers are mounted, the layering client may dismount the other layers. The layering client mounts the target storage location as a layer. The layering configures the LFFD and the LRFD, if an LRFD is present, to operate in an "install" or "create layer" state. While in the "install" state, a user may install applications using standard application installer technology, and the installed applications will be created on the newly created layer. Once all applications have been installed, the layering client may receive a notification that installation is complete and that the layering system should be put back into a "normal" or "runtime" state. At this point, the layering client may dismount the newly created layer. The layering client configures the LFFD and the LRFD, if an LRFD is present, to operate in a "normal" or "runtime" state.

In particular embodiments, the LFFD may be loaded onto a file system stack of the information handling system's operating system (OS). The LFFD may register with the OS to receive notifications for all file operations (e.g. create, open, close, read, write, rename, delete, directory enumeration, etc.). The LFFD is operable to allow a file operation to pass-through to the file system, or the LFFD may modify a file operation. By way of example and not by way of limitation, the LFFD may modify a file operation by blocking the operation, replicating the operation, redirecting the operation, or performing one of the operations described herein.

In the normal or runtime state, the LFFD examines each file operation and determines whether the file operation must be redirected or modified to make use of a file contained in a mounted layer. This determination may be made by performing a path lookup against metadata describing the files contained in the mounted layers. For example, the LFFD may load the file metadata for a layer when it is mounted, and then use the file metadata to perform a path lookup.

In particular embodiments, a method for handling a file open operation by the LFFD is disclosed. The LFFD receives a notification of a file open operation, and identifies the target file from the notification. Next, the LFFD may perform a path lookup against the file metadata of a first mounted layer. If there is no match, the LFFD may move to the next mounted layer and perform a path lookup against the file metadata of the next mounted layer recursively until there are no other mounted layers or a match is found. If there are no other mounted layers, the LFFD will allow the file open operation to be handled by the file system. When a path lookup results in a match, the LFFD looks for a file described by file metadata. If the file is found in the mounted layer, the LFFD modifies the file open operation by redirecting the target of the file open operation to point to the file found in the mounted layer. If no file is found in the mounted layer, the LFFD proceeds to perform a path lookup against the next mounted layer and so on. The order in which the LFFD checks the file metadata of each mounted layer may be determined by a priority or ordering assigned to the layers.

For example, assume a layer is mounted as drive E:, and the layer contains a file "FOO.txt" that is associated with the path "\Program Files\App\". If the LFFD receives a notification for a file open operation that specifies a target of "C:\Program Files\App\Foo.txt", the LFFD will perform a path lookup against the file metadata for all mounted layers. In this example, the LFFD will match the path "\Program Files\App\", and determine that the file operation may be associated with the layer mounted at E:. Next, the LFFD will check to see if there is a file "FOO.txt" in the mounted layer. In this example, the LFFD will locate the file "FOO.txt". Having made the determination that the file operation targets a file associated with a mounted layer, the LFFD will redirect the file open operation such that the file located at "E:\Program Files\App\Foo.txt" is opened instead of a file located at the same path on the C: drive, even if such a file existed. If the LFFD matches the path to a mounted layer, but the LFFD does not locate the described file within the layer, then the LFFD will allow the file operation to pass to the file system of the operating system for normal handling.

In particular embodiments, a method for handling a file directory enumeration operation by the LFFD is disclosed. The LFFD receives a notification of a file directory enumeration operation, and identifies the target file directory. For each mounted layer, the LFFD creates a file directory enumeration operation that targets the mounted layer. The results returned by the file directory enumeration operation for each mounted layer are merged together with the result of a file directory enumeration operation that is allowed to pass-through to the file system. Before returning the results, the LFFD will filter out duplicate files such that only the file associated with the highest priority layer is returned.

For example, assume there is a first layer mounted at E:, a second layer mounted at F:, and a third layer mounted at G:. When the LFFD receives a notification of a file directory enumeration operation targeting "C:\Program Files\App\", the LFFD will send file directory enumeration operations targeting "E:\Program Files\App\", "F:\Program Files\App\", and "G:\Program Files\App\". The results of these operations are merged with the result of a file directory enumeration operation that is passed-through to the file system targeting "C:\Program Files\App\". To the user or an application, the results appear to only come from a single directory while the results were generated by combining the files in four different file directories. If there are two or more files with the same name across the four different file directories, the LFFD will filter out the duplicate file names according to the priority or ordering assigned to the layers.

In particular embodiments, a method for handling a file directory enumeration operation by the LFFD using a file directory query hook is disclosed. The LFFD makes use of a directory query hook provided by file system instead of creating separate file directory enumeration operations that target each mounted layer. First, the LFFD receives a file directory enumeration operation. The LFFD identifies the highest priority layer, redirects the file directory enumeration operation to the highest priority layer, sets a flag that indicates that more results will be available, and records in metadata the next layer to be queried. When the query is returned from the highest priority layer, the initiating process receives the results, and the set flag triggers the initiating process to resubmit the file directory enumeration operation. The LFFD recognizes that the file directory enumeration operation is a continuation of a prior request, checks the metadata to identify the next layer to be queried, redirects the operation to the next layer, sets the flag indicating that more results are available, and updates the metadata to identify the next layer to be queried. The process continues until there are no more layers to check, in which case, the operation is passed-through to the file system. During this process, the LFFD tracks the results returned by each operation, and filters duplicate files from subsequent queries to prevent multiple files with the same name appearing in the directory view.

In particular embodiments, it may be unnecessary for the LFFD to modify the behavior of other file operations if the remaining types of file operations make use of a file handle. For example, if a file open operation must be performed before a read file operation, a write file operation, or a close file operation, no modification to these file operations are necessary so long as the file operations make use of a file handle returned from a file open operation. If the target file is associated with a file in a layer, then the file handle returned by the file open operation will have been redirected to the layer resource by the LFFD. Continuing the previous example, when a file open operation targeting "C:\Program Files\App\Foo.txt" is handled by the LFFD, the LFFD returns a file handle that points to the "FOO.txt" file at its location in the layer mounted at the E: drive. Any subsequent file operations using the file handle will make use of the file located in the layer automatically.

In particular embodiments, the LFFD may perform the path lookups described herein using cached metadata. In a particular embodiment, the metadata cache is created by loading metadata stored in a layer when the layer is first mounted. The cached metadata can be stored as a hash table where paths are used as the hash key or as in-memory search tree.

In another particular embodiment, the metadata cache is implemented using Microsoft Windows registry hives. In this embodiment, the file metadata for each layer is stored in a registry hive in each layer. When the layer is mounted, the LFFD locates the registry hive containing the file metadata for the layer, and loads the registry hive into the registry. The LFFD performs path lookups by querying each layer's registry hive loaded into the registry. When the layer is dismounted, the LFFD unloads the registry hive from the registry.

In particular embodiments, a method for handling a file create operation by the LFFD operating in an "install" or "create layer" mode is disclosed. The LFFD receives a notification of a file create operation, and determines the target path. The LFFD redirects the file create operation to a destination location on the storage medium for the mounted layer that is in an "install" state. The LFFD may update the file metadata associated with the mounted layer to include information concerning the target path and the destination location to facilitate a path lookup. The LFFD may return a file handle pointing to the destination location to the calling process.

For example, assume that the layer in an "install" state is mounted as E:. While the layering system is in install mode, the user runs an installer package for an application. The installer package attempts to create a file at the target path "C:\Program Files\App\Foo.txt". The LFFD receives a notification of the file create operation, and redirects the file create operation to the destination path "E:\Program Files\App\Foo.txt". The LFFD may update the file metadata to associate the target path "\Program Files\App\Foo.txt" with the destination path within the layer "\Program Files\App\Foo.txt". At the completion of the file create operation, the installer package receives a file handle that points to the file stored at "E:\Program Files\App\Foo.txt".

In particular embodiments, a method for handling a file modify operation by the LFFD operating in an "install" or "create layer" mode is disclosed. The LFFD receives a notification of a file modification operation, and determines the target path. The LFFD redirects the file create operation to a destination location on the storage medium for the mounted layer that is in an "install" state. If the file does not exist on the storage medium for the mounted layer, the file may be copied from the target path to the mounted layer, and then apply the modification. The LFFD may update the file metadata associated with the mounted layer to include information concerning the target path and the destination location to facilitate a path lookup. The LFFD may return a file handle pointing to the destination location to the calling process.

If the information handling system 100 is running an operating system that uses a registry for storing configuration settings (for example, a Microsoft Windows operating system), then a layering registry filter driver (LRFD) may be provided. The LRFD may register with the OS to receive a notification for all registry operations (e.g. create key, get key value, delete key, delete key value, enumerate keys, etc.). The layering registry filter driver can allow a registry operation to pass-through to the OS's registry, or block, replicate or redirect the registry operation to target configuration metadata in a mounted layer. In the normal or runtime state, the LRFD examines each registry operation and determines whether the registry operation must be redirected or modified to make use of a registry key or value associated with a mounted layer. This determination may be made by performing a lookup against the configuration metadata stored in the mounted layers.

In particular embodiments, a method for handling a registry modification or retrieval operation by the LRFD is disclosed. The LRFD receives a notification of a registry modification or retrieval operation (e.g., get registry key value or set registry key value), and identifies the target key from the notification. Next, the LRFD queries the configuration metadata for each mounted layer in the order of priority assigned to the mounted layers. When the first match is found, the LRFD redirects the registry operation to the configuration metadata in the mounted layer associated with the first match, and returns the result to the calling process. If there is no match, the LRFD allows the registry operation to pass-through to the registry for normal handling.

For example, assume there is a first layer mounted at E:, a second layer mounted at F:, and a third layer mounted at G:. Also assume that the second layer's configuration metadata contains a key and value associated with the registry path "HKEY_LOCAL_MACHINE\SOFTWARE\Vendor\Key1", and assume that the registry also contains a key and value at the same path. When the LRFD receives a notification of a registry get key value operation targeting "HKEY_LOCAL_MACHINE\SOFTWARE\Vendor\Key1", the LRFD will query configuration metadata for the first mounted layer and not find a match, the LRFD will query configuration metadata for the second mounted layer and find a match. At this point, the LRFD will redirect the registry operation to the configuration metadata of the second layer, and the calling process will receive the value stored in the configuration metadata of the second layer. Continuing with this example, assume that the registry path does not exist in the second mounted layer. With this modification, the LRFD would query the configuration data of all three mounted layers, and not find a match. At this point, the LRFD would allow the registry operation to be handled by the registry.

In particular embodiments, a method for handling a registry enumeration operation by the LRFD is disclosed. The LRFD receives a notification of a registry enumeration operation, and identifies the target registry path from the notification. Next, the LRFD queries the configuration metadata for each mounted layer in the order of priority assigned to the mounted layers. For each queried configuration metadata, the LRFD gathers and merges all of the registry keys and values associated with the target path. If there are registry keys that are the same in more than one configuration metadata or the registry, the LRFD filters out the registry keys and values associated with the lower priority layers and the registry. The combined results are returned to the calling process.

In particular embodiments, a registry operation that requires the creation of new keys or trees while the LRFD is in a "normal" or "runtime" state is allowed to pass-through to the registry. Although this disclosure describes particular embodiments of methods for handling registry operations by the LRFD, the disclosure contemplates other embodiments of methods for handling registry operations by the LRFD.

In particular embodiments, a method for handling a registry key create operation by the LRFD operating in an "install" or "create layer" state is disclosed. The LRFD receives a notification of a registry create operation (e.g., create registry key), and identifies the target key from the notification. Next, the LRFD redirects the registry operation to the configuration metadata in the mounted layer that is in an "install" state.

In particular embodiments, the configuration metadata is registry hive stored in the layer. In such an embodiment, redirecting the registry operation comprises redirecting the registry operation from the registry to the registry hive stored in the layer.

For example, assume that the layering system is in an "install" or "create layer" state. While an application installer executes, the installer package attempts to create a new key at target registry path "HKEY_LOCAL_MACHINE\SOFTWARE\Vendor\Key1" and value "Value1". The LRFD receives a notification of the registry create key operation, and redirects the registry create key operation to the destination path "HKEY_LOCAL_MACHINE\SOFTWARE\Vendor\Key" in the registry hive stored in the layer that is mounted in the "install" state. The installer application receives a notification that the registry operation was successful, even though the new key and value were stored in a registry hive stored in the mounted layer as opposed to the registry.

In particular embodiments, a method for handling a registry key modification operation by the LRFD operating in an "install" or "create layer" state is disclosed. The LRFD receives a notification of a registry key or value modification operation (e.g., set key value), and identifies the target key from the notification. Next, the LRFD redirects the registry modification operation to the configuration metadata in the mounted layer that is in an "install" state. If the target key or entry does not already exist in the configuration metadata (e.g. the registry key being modified was previously created in the registry), the target key will be created in the configuration metadata and the modification applied. The calling process or application receives a notification that the registry operation was successful, even though the modification was not applied to the registry.

For example, assume that there is a pre-existing registry key in the registry at the registry path "HKEY_LOCAL_MACHINE\SOFTWARE\Vendor\Key1" that has a value "Value1". After the layering system switches to an "install" or "create layer" state, an application attempts to change the data of the value associated with a key. The LRFD will receive a notification of the registry modification operation, and will redirect the change to the configuration metadata stored in the layer mounted in the "install" or "create layer" state. If the key does not already exist in the layer, the key is created and the data associated with the value is set to "Value2". If the key already exists in the layer, the data associated with the value is changed to "Value2". The data of the value associated with the key in the registry is left unmodified as "Value1". The calling process is notified that the operation was successful even though the registry was not modified.

In one embodiment, a layer is an application layer. An application layer may be shared between different users. The file data on a shared application layer may be protected by typical copy-on-write techniques. However, copy-on-write techniques do not protect file data from loss due to deletion or renaming of a corresponding file and/or folder. One way to preserve file data is by not permitting a rename or delete operation of a file or folder corresponding to file data on the read-only layer. However, denial of such operations may result in poor user experience, poor application performance or inability of an application to execute. Block based caching fails to solve this issue because any unrelated modifications to the base application layer invalidates the block based cache containing all of the user changes. For example, if a new version of an application is installed, any user-specific modifications are lost.

The present disclosure solves the issue of preserving delete and rename operations without losing user-specific modifications to file data.

Every user of an information handling system 100 has associated with the user a user-specific read-write layer. The write-layer is not shared between the different users of an information handling system 100. File system level hooks are used to capture and simulate rename and delete operations of files and folders on the read-only layers for a given user or multiple users. Just as every application layer has an associated file system metadata cache, each read-write layer has an associated file system metadata cache that gives an overview of the data contained by the layer.

In one embodiment, a rename or delete operation of a file or folder associated with file data on a read-only layer causes a virtual link to be created in the metadata cache for the read-write layer. The LFFD uses the virtual links to internally point to the original folder and/or file containing the original file data on the read-only layer. Any relevant metadata is added or merged into this virtual link and stored in the metadata cache. The type of operations, for example, rename or delete operations, performed on the original file or folder containing the original file data is tracked in the metadata cache. Further, access to the original file or folder may also be monitored by tracking the access in the metadata cache.

For example, in one embodiment metadata flags in the virtual link are set to indicate that a delete or rename operation was performed on the original file. Subsequent access to the original file is blocked as the metadata flags in the virtual link have been set. Setting a metadata flag may comprise setting a value of a memory location to a logical "0" or to a logical "1" or any other value known to one of ordinary skill in the art.

In another example, an open on the target file from the rename operation (renamed target file) is internally redirected to the source file if the metadata flag indicates completion of a previous rename operation on the original file. For example, a user renames an original file "FOO.txt" to "BAR.txt." If the original layer is read-only, the original file "FOO.txt" is not altered or renamed. If an open operation occurs with respect to the layer without layering drivers, "FOO.txt" is the file that is opened. However, in one embodiment, a metadata entry for "BAR.txt" is created in the read-write layer. The metadata entry for "BAR.txt" may include one or more parameters that may be used by the LFFD. For example, the metadata entry may comprise a parameter that indicates that "BAR.txt" is the target file for a rename operation associated with "FOO.txt." That is, the parameter of the metadata entry may indicate that "BAR.txt" was created as a result of a rename operation on some read-only layer. The metadata entry may also comprise a rename source parameter. This parameter provides the source for the rename operation. For example, the source parameter may indicate the complete file path information of the original file "FOO.txt" including the layer name associated with "FOO.txt" for the rename operation. The metadata entry may also include a rename target parameter. The rename target parameter may indicate the target file of the rename operation. For example, the rename target parameter may indicate "BAR.txt" on the write layer. Note, "BAR.txt" is not a real or actual file on the write layer, rather "BAR.txt" is a metadata entry that allows the user and any applications associated with the user to perform the "rename" and "delete" operations. "BAR.txt" is presented to the user and any applications associated with the user as if "BAR.txt" actually exists.

In one embodiment, when a user queries for the list of files of a parent folder, the LFFD processes the metadata entries (for example, iteratively analyzes the metadata entries) for both the read-only layer and the read-write layer. If the LFFD discovers a "FOO.txt" file but also finds a "BAR.txt" metadata entry with one or more parameters indicative of a rename of "FOO.txt" to "BAR.txt", the LFFD modifies the response to the user's or an application's request. For example, the LFFD replaces the reference to "FOO.txt" to "BAR.txt" and sends the response to the user or the associated application with the reference to "BAR.txt." In this way, the user and the associated application function as if "BAR.txt" is the requested file from the requested directory or folder.

In one embodiment, when a user requests or an application sends a request to open "BAR.txt," the LFFD captures or intercepts the open request, as there is no actual "BAR.txt" file, the file system cannot handle the request. The LFFD determines the source file (for example, "FOO.txt") associated with the renamed target file ("BAR.txt") and redirects the open request to the source file (for example, "FOO.txt") present on the read-only layer. The user and the associated application function as if the target file (for example, "BAR.txt") was opened and the data is then read from the source file (for example, "FOO.txt").

Figure 4:
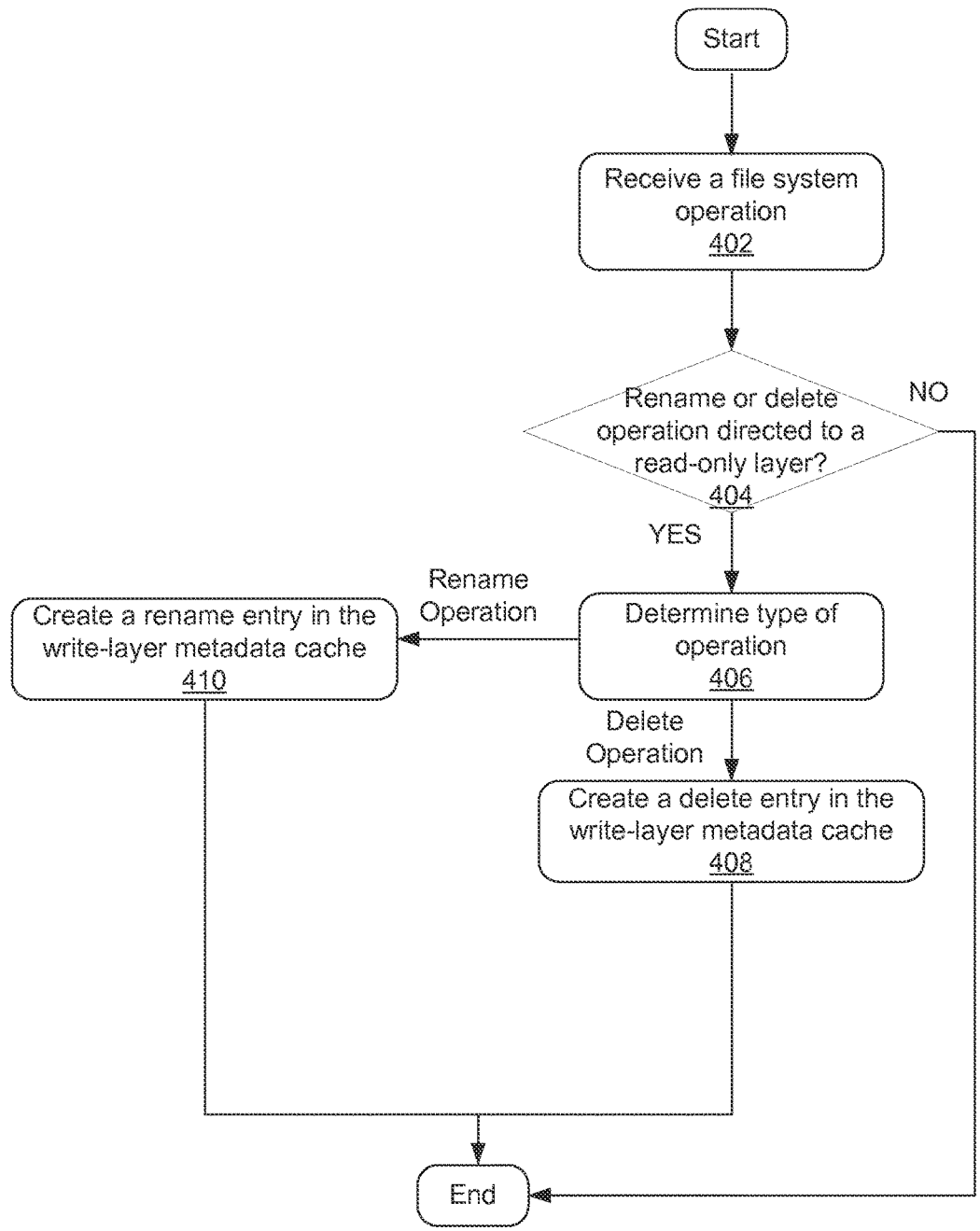
FIG. 4 illustrates a method of protecting files and folders shared on a shared application layer according to one or more embodiments of the present disclosure.

FIG. 4 illustrates a method of protecting files and folders shared on a shared application layer according to one or more embodiments of the present disclosure. A file or a folder may be any type of file or folder and may have any type of file name or folder name known to one of ordinary skill in the art. A folder may be a directory path, a name of a particular location where one or more files are stored, or any other type of folder known to one of ordinary skill in the art. At step 402, the LFFD will register to receive all file system operations of information handling system 100. For example, the file system operation may be a delete operation, a rename operation, a query operation, or any other file system operation known to one of ordinary skill in the art. This registration will allow the LFFD to track all file system activities on the information handling system 100.

At step 404, when a file system operation is initiated, it is determined whether the operation is a rename or delete operation directed to a read-only layer. If the file system operation is not a rename or delete operation then the method ends or processing continues in any manner known to one of ordinary skill in the art. If it is determined that the file system operation is one of a rename or delete operation, then at step 406 the type of operation is determined so that the appropriate processing may be performed. The corresponding write-layer associated with the read-only layer is also determined such that any metadata entry created will be created in the appropriate write-layer. Throughout, a reference to a file may likewise be a reference to a folder with the same steps or operations applicable to both.

At step 410, the LFFD will create a new entry, for example, a file entry, in the metadata cache associated with the corresponding write-layer. This new entry will be created with the new name (or target name or target file) associated with the rename operation and will contain a link to the previous or original file. A metadata flag in the metadata cache for the write-layer will be set to indicate that no physical file exists with this new name associated with the rename operation and that the metadata entry is for a rename operation performed on the original file located on a read-only layer. For example, "FOO.txt" exists on a read-only layer. A file system operation by a specific user requests that the original file "FOO.txt" be renamed to "BAR.txt." The LFFD will create a new entry in the metadata cache of the write-layer associated with the specific user. The new entry is created with the target name or the target file "BAR.txt" and contains a link to "FOO.txt" or the metadata cache entry comprises a parameter indicative of the target name or target file. A metadata flag in the metadata cache of the specific user's associated write-layer will indicate that "BAR.txt" does not exist and that a rename operation was initiated for "FOO.txt."

If the operation at step 406 is a delete operation, then at step 408 the LFFD will create a new entry in the metadata cache of the write-layer associated with the specific user. This new entry will be created using the name of the original file associated with the delete operation. The LFFD will create a metadata flag in the metadata cache of the specific user's associated write-layer to indicate that the original file has been deleted. For example, a delete operation directed to deleting the file "FOO.txt" occurred. The LFFD will create a new entry in the metadata cache of the write-layer associated with the specific user using the source name, for example, "FOO.txt." The LFFD will create a metadata flag in the metadata cache of the specific user's associated write-layer will indicate that "FOO.txt" does not exist and that a delete operation occurred associated with "FOO.txt."

Figure 5:
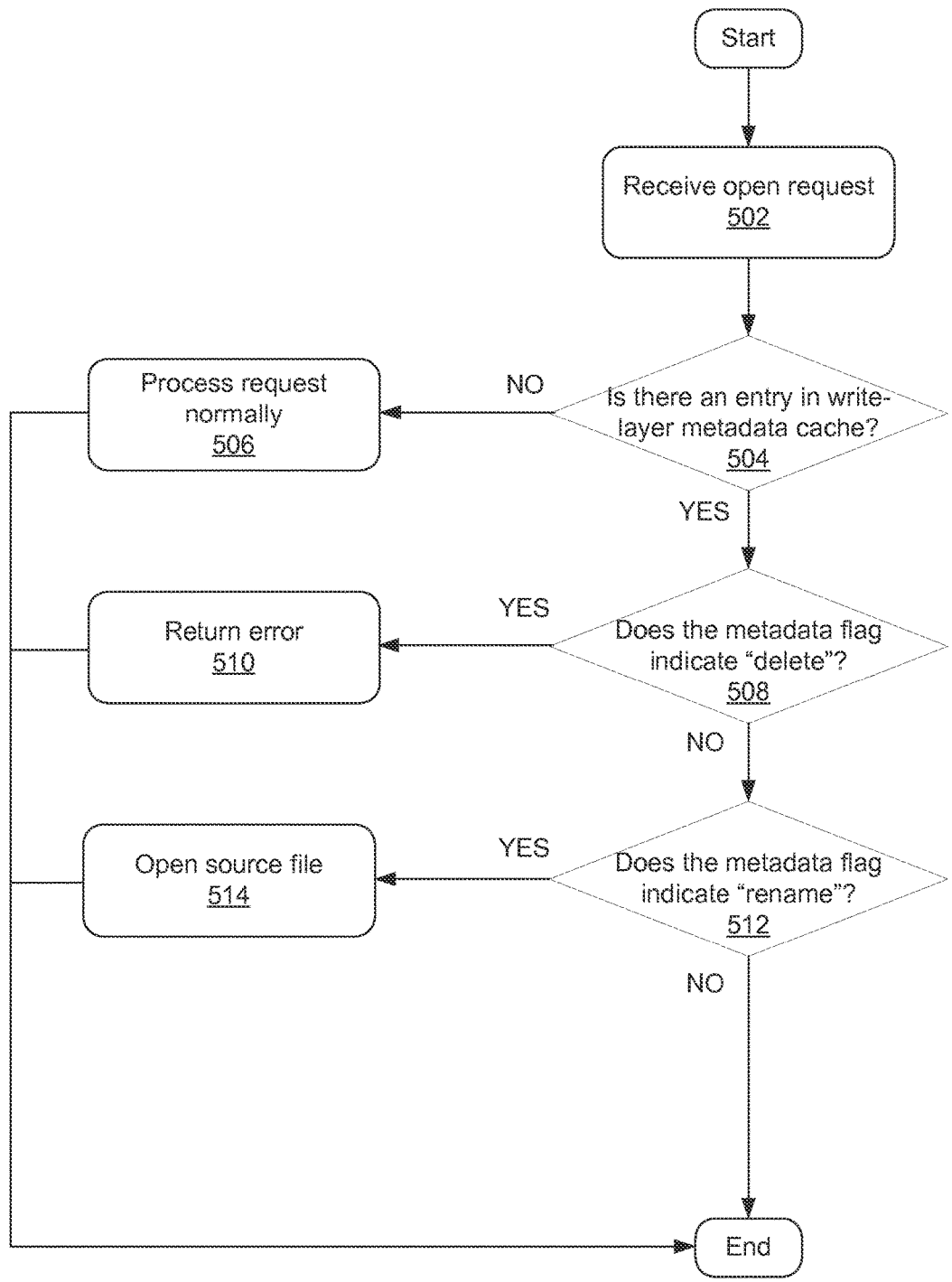
FIG. 5 illustrates a method of protecting files and folders shared on a shared application layer according to one or more embodiments of the present disclosure.

FIG. 5 illustrates a method of protecting files and folders shared on a shared application layer according to one or more embodiments of the present disclosure. At step 502, a request is received at information handling system 100 to open a file. At step 504, the LFFD determines if a corresponding entry exists for the file in the write-layer metadata cache associated with the specific user. If an entry does not exist, the open request is processed normally at step 506.

If a corresponding entry does exist in the write-layer metadata cache, then at step 508 the LFFD determines if a metadata flag indicates that the file associated with the open request has been deleted. If the metadata flag indicates that this file has been deleted, at step 510 an error is returned that indicates that the open operation cannot be performed on the requested file.

If the metadata flag does not indicate that the file associated with the open request has been deleted, then at step 512 the LFFD determines if the metadata flag indicates that the file associated with the open request has been renamed. If the metadata flag indicates that this file has been renamed, at step 514 the original file or source file as indicated by the metadata cache is opened.

In any one or more embodiments, a delete metadata flag and a rename metadata flag may be unique flags in the metadata cache and each unique flag corresponds to steps 508 and 512 respectively. In other embodiments, the metadata flag may have different values to indicate delete and rename operations.

Figure 6:
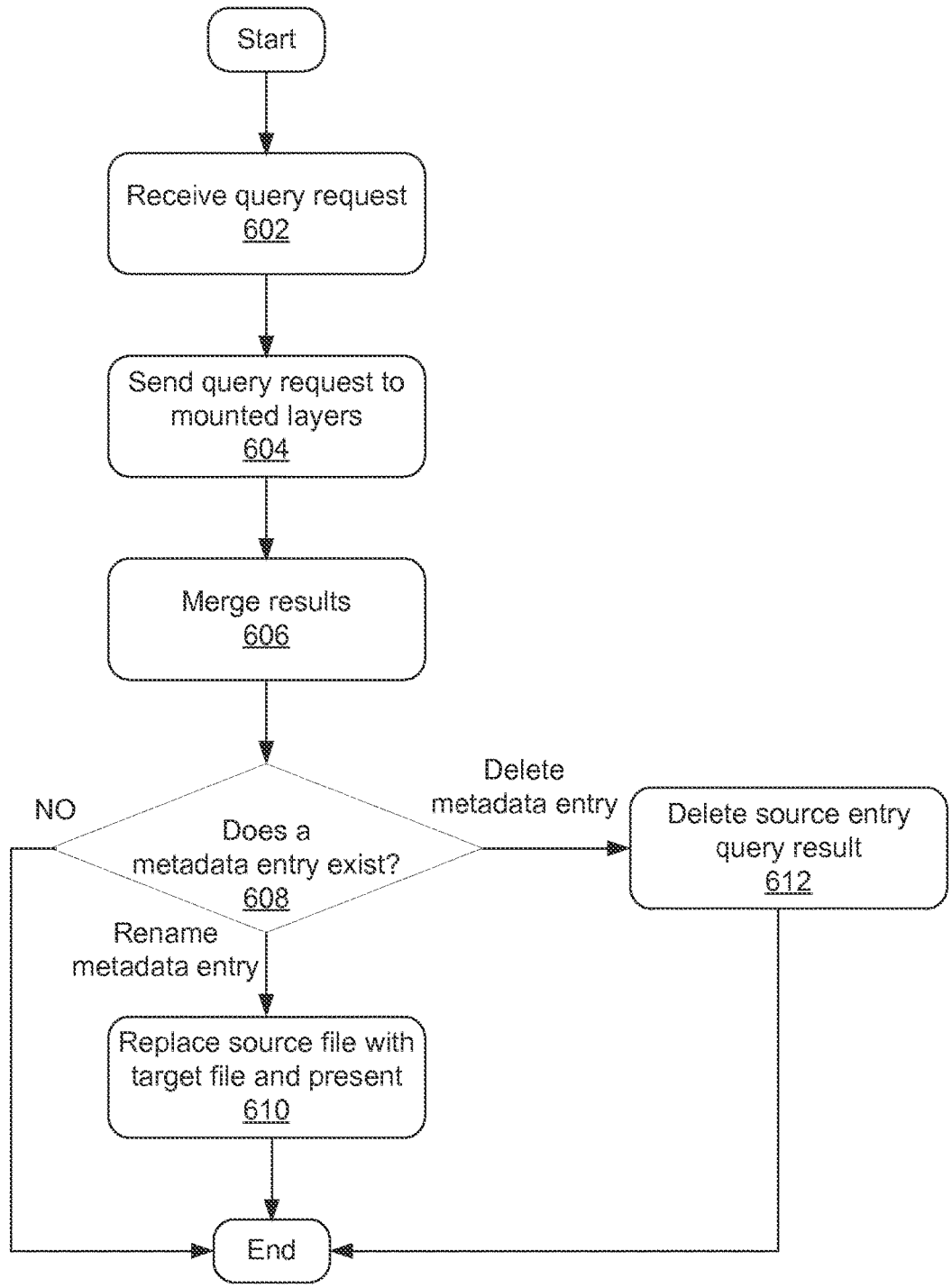
FIG. 6 illustrates a method of querying files and folders on a shared application layer according to one or more embodiments of the present disclosure.

FIG. 6 illustrates a method of querying files and folders on a shared application layer according to one or more embodiments of the present disclosure. In one embodiment, at step 602 a query request is received. For example, a user queries (or an application sends a query request) for a list of files present in a parent folder or directory. At step 604, the LFFD sends the query request to all mounted layers, including the associated user specific read-write layer. At step 606, the results from the query request to all mounted layers are merged. At step 608, it is determined if a metadata entry of a metadata cache for a mounted layer exists for the file and/or folder associated with the query request. For example, the merged results may be processed or analyzed by a query response handler associated with a rename operation and/or a delete operation. For example, the LFFD processes or analyzes the metadata entries in the metadata cache of the associated read-write layer. If the LFFD determines that a rename metadata entry exists, (for example, that a rename operation occurred for "FOO.txt" such that the target file "BAR.txt" is now associated with "FOO.txt" as the target file or the renamed file), then at step 610 the LFFD replaces the source file (for example, "FOO.txt") of the query request with the target file ("BAR.txt"). The user and the associated application are presented with a response that includes the target file (for example, "BAR.txt", the target of the rename operation) instead of the source file (for example, "FOO.txt"). If the LFFD determines that a delete metadata entry exists in a metadata cache of a mounted layer (for example, that a delete operation occurred for "FOO.txt" such that a metadata entry on the write-layer was created, while "FOO.txt" remains as is on the read-only layer), then at step 612 the LFFD returns a response that does not include the source file of the query request, for example, the associated entry in the query result is deleted. The user and the associated application are presented with a response that does not include the file or folder of the query request even though the source file or folder may still exists on the read-only layer. In this way the metadata entries associated with a user controls the presentation of a query request response to the user.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of protecting one or more of one or more files and one or more folders using a layering file-system filter driver (LFFD) comprising:
    mounting one or more layers, wherein the one or more mounted layers are determined by a layering client based on at least one of a user, a role associated with the user, an identifier of the information handling system and a geographic location;
    managing by the layering client the one or more mounted layers;
    configuring the LFFD by the layering client;
    registering the LFFD to receive all file system operations;
    receiving, for a specific user of an information handling system, a first file system operation associated with a read-only layer, wherein the first file system operation comprises at least one of a rename operation and a delete operation;
    determining a write-layer, associated with the specific user, corresponding to the read-only layer;
    creating a first entry in a write-layer metadata cache of the write-layer associated with the file system operation for the specific user, wherein the first entry comprises a reference to one or more of a first file and a first folder, and wherein the write-layer metadata cache is created by loading metadata stored in an associated layer when the associated layer is first mounted;
    creating a metadata flag by the LFFD in the write-layer metadata cache of the write-layer associated with the file system operation for the specific user indicative of the first file system operation;
    receiving a second file system operation, wherein the second file system operation comprises one of an open operation, a rename operation, a delete operation, and a query operation, and wherein the second file system operation includes a reference to one or more of the first file and the first folder;
    modifying a response to the second file system operation based, at least in part, on the first entry and the metadata flag; and
    presenting the modified response.

2. The method of claim 1, wherein the first file system operation is a rename operation, and wherein creating the first entry comprises creating a rename entry in the write-layer metadata cache.

3. The method of claim 2, wherein creating the rename entry comprises:
    creating a link associated with the rename entry to the one or more of the first file and the first folder;
    creating a parameter associated with the rename entry indicative of one or more of a second file and a second folder associated with the rename operation; and
    setting a flag associated with the rename entry indicative of the rename operation.

4. The method of claim 1, wherein the first file system operation is a delete operation, and wherein creating the first entry comprises creating a delete entry in the write-layer metadata cache.

5. The method of claim 4, wherein creating the delete entry further comprises:
    creating a link associated with the delete entry to the one or more of the first file and the first folder; and
    setting a flag associated with the delete entry indicative of the delete operation.

6. The method of claim 1, wherein the second file system operation is a query operation.

7. The method of claim 6, further comprising:
    sending the query operation to all mounted layers;
    merging results from the mounted layers; and
    determining that the first entry exists based, at least in part, on the merged results.

8. One or more computer-readable non-transitory storage media embodying logic that is operable when executed to:
    mount one or more layers, wherein the one or more mounted layers are determined by a layering client based on at least one of a user, a role associated with the user, an identifier of the information handling system and a geographic location;

manage by the layering client the one or more mounted layers;

configure the layering file-system filter driver (LFFD) by the layering client;

register the LFFD to receive all file system operations;

receive, for a specific user of an information handling system, a first file system operation, wherein the first file system operation comprises one of a rename operation and a delete operation;

determine a write-layer, associated with the specific user, corresponding to the read-only layer;

create a first entry in a write-layer metadata cache of the write-layer associated with the file system operation for the specific user, wherein the first entry comprises a reference to one or more of a first file and a first folder, and wherein the write-layer metadata cache is created by loading metadata stored in an associated layer when the associated layer is first mounted;

create a metadata flag by the LFFD in the write-layer metadata cache of the write-layer associated with the file system operation for the specific user indicative of the first file system operation;

receive a second file system operation, wherein the second file system operation comprises one of an open operation, a rename operation, a delete operation, and a query operation, and wherein the second file system operation includes a reference to one or more of the first file and the first folder;

modify a response to the second file system operation based, at least in part, on the first entry and the metadata flag; and present the modified response.

9. The one or more computer-readable non-transitory storage media of claim 8, wherein the first file system operation is a rename operation, and wherein creating the first entry comprises creating a rename entry in the write-layer metadata cache.

10. The one or more computer-readable non-transitory storage media of claim 9 that when creating the rename entry is further operable when executed to:

create a link associated with the rename entry to the one or more of the first file and the first folder;

create a parameter associated with the rename entry indicative of one or more of a second file and a second folder associated with the rename operation; and set a flag associated with the rename entry indicative of the rename operation.

11. The one or more computer-readable non-transitory storage media of claim 8, wherein the first file system operation is a delete operation, and wherein creating the first entry comprises creating a delete entry in the write-layer metadata cache.

12. The one or more computer-readable non-transitory storage media of claim 11 that when creating the delete entry is further operable executed to:

create a link associated with the delete entry to the one or more of the first file and the first folder; and set a flag associated with the delete entry indicative of the delete operation.

13. The one or more computer-readable non-transitory storage media of claim 8, wherein the second file system operation is a query operation.

14. The one or more computer-readable non-transitory storage media of claim 13 that is further operable when executed to:

send the query operation to all mounted layers;

merge results from the mounted layers; and determine that the first entry exists based, at least in part, on the merged results.

15. An information handling system comprising:

one or more processors; and a memory coupled to the processors comprising instructions executable by the processors, the processors being operable when executing the instructions to:

mount one or more layers, wherein the one or more mounted layers are determined by a layering client based on at least one of a user, a role associated with the user, an identifier of the information handling system and a geographic location;

manage by the layering client the one or more mounted layers;

configure the layering file-system filter driver (LFFD) by the layering client;

register the LFFD to receive all file system operations;

receive, for a specific user of the information handling system, a first file system operation associated with a read-only layer, wherein the first file system operation comprises one of a rename operation and a delete operation;

determine a write-layer, associated with the specific user, corresponding to the read-only layer;

create a first entry in a write-layer metadata cache of the write-layer associated with the file system operation for the specific user, wherein the first entry comprises a reference to one or more of a first file and a first folder, and wherein the write-layer metadata cache is created by loading metadata stored in an associated layer when the associated layer is first mounted;

create a metadata flag by the LFFD in the write-layer metadata cache of the write-layer associated with the file system operation for the specific user indicative of the first file system operation;

receive a second file system operation, wherein the second file system operation comprises one of an open operation, a rename operation, a delete operation, and a query operation, and wherein the second file system operation includes a reference to one or more of the first file and the first folder;

modify a response to the second file system operation based, at least in part, on the first entry and the metadata flag; and present the modified response.

16. The information handling system of claim 15, wherein the first file system operation is a rename operation, and wherein creating the first entry comprises creating a rename entry in the write-layer metadata cache.

17. The information handling system of claim 16, wherein the memory coupled to the processors comprising instructions executable by the processors, the processors being operable when executing the instructions to:

create a link associated with the rename entry to the one or more of the first file and the first folder;

create a parameter associated with the rename entry indicative of one or more of a second file and a second folder associated with the rename operation; and set a flag associated with the rename entry indicative of the rename operation.

18. The information handling system of claim 15, wherein the first file system operation is a delete operation, and wherein creating the first entry comprises creating a delete entry in the write-layer metadata cache.

19. The information handling system of 18, wherein the memory coupled to the processors comprising instructions executable by the processors, the processors being operable when executing the instructions to:
- create a link associated with the delete entry to the one or more of the first file and the first folder; and
- set a flag associated with the delete entry indicative of the delete operation.

20. The information handling system of claim 15, wherein the memory coupled to the processors comprising instructions executable by the processors, the processors being operable when executing the instructions to:
- wherein the second file system operation is a query operation;
- send the query operation to all mounted layers;
- merge results from the mounted layers; and
- determine that the first entry exists based, at least in part, on the merged results.

* * * * *